United States Patent Office
2,898,888
Patented Aug. 11, 1959

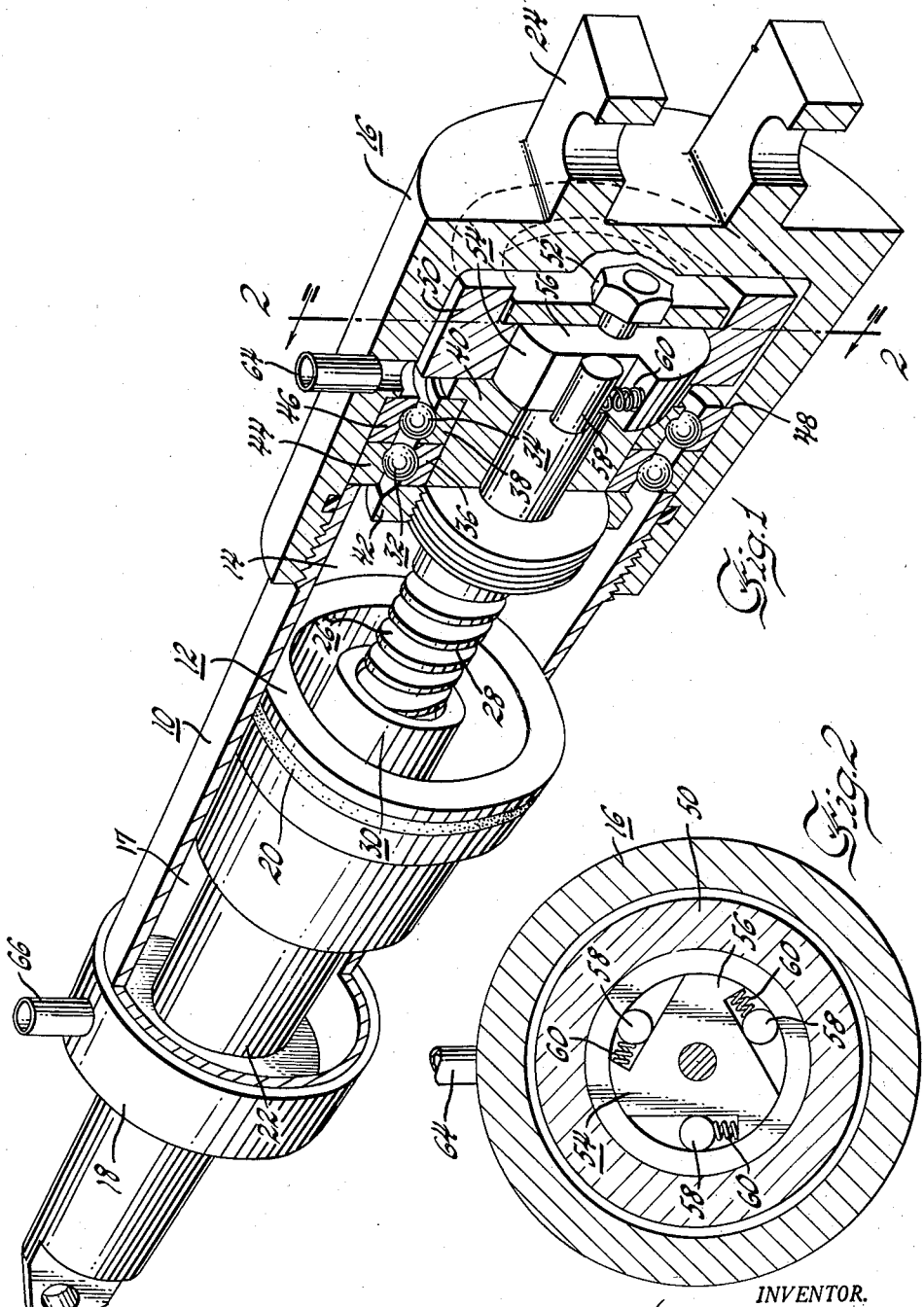

2,898,888

PNEUMATIC ACTUATOR ASSEMBLY

Howard M. Geyer, Dayton, Ohio, assignor to General Motors Corporation, Detroit, Mich., a corporation of Delaware Application December 12, 1955, Serial No. 552,482

9 Claims. (Cl. 121—38)

This invention pertains to actuators, and particularly to an actuator assembly designed for pneumatic or hydraulic operation.

It has been observed that linear pneumatic actuators often fail due to rapid acceleration of the actuator piston after the force of the load and friction have been overcome by the pneumatic pressure. This phenomenon occurs since a gas, unlike a liquid, is compresisble, and, therefore, as soon as the force of the load and friction are overcome, the gas expands and effects rapid movement of the piston. In some instances, this rapid movement of the piston during pneumatic operation has resulted in destruction of the actuator. However, if the same actuator is operated by hydraulic fluid under pressure, the operation will be smooth since hydraulic fluid is virtually incompressible, and, therefore, as soon as the piston moves under the urge of hydraulic pressure, the pressure will drop and unless additional hydraulic fluid under pressure is supplied, the piston will stop moving. The present invention relates to an actuator designed for either pneumatic or hydraulic operation including inertia weight means for limiting acceleration during pneumatic operation. Accordingly, among my objects are the provision of an actuator assembly including inertia weight means for limiting acceleration of the actuator piston in one direction; the further provision of a pneumatic actuator including a cylinder, a reciprocable piston, and inertia weight means operatively connected to the piston for limiting acceleration thereof; and the still further provision of an actuator designed for either pneumatic or hydraulic operation including a cylinder, a reciprocable piston, a rotatable member connected to the piston so as to rotate upon piston movement and an inertia weight operatively connected to the rotatable member through a one-way clutch for limiting acceleration of the piston in one direction during pneumatic operation.

The aforementioned and other objects are accomplished in the present invention by operatively connecting an inertia weight member to the actuator piston through a rotatable screw shaft whereby a relatively small weight member acts like a dead weight load of substantial magnitude due to the reduction effect between the rotary speed of the screw shaft and the linear movement of the piston. Specifically, the actuator comprises a cylinder having a reciprocable piston therein. The piston divides the actuator cylinder into an extend chamber and a retract chamber, and the actuator is designed so that hydraulic fluid under pressure may be admitted to either chamber while the opposite chamber is connected to drain to effect hydraulic operation of the actuator in either direction. In addition, the extend chamber may be connected to a source of pneumatic pressure which is used to effect emergency extension of the actuator when the hydraulic system fails.

The actuator also includes a rotatable member, or screw shaft which is bearing supported within the cylinder and operatively connected to the piston through a ball nut arrangement of conventional design. Accordingly, movement of the piston is dependent upon and effects rotation of the screw shaft, and due to the reduction between the screw shaft and the nut, the screw shaft will rotate at a high velocity during linear movement of the piston at a relatively slow velocity. In order to limit acceleration of the piston during pneumatic operation, an inertia weight of small mass, in the form of an annulus, is operatively connected to the screw shaft for rotation therewith in one direction through a one-way roller clutch of conventional design. Due to the speed reduction between the screw shaft and the piston, the inertia weight acts like a dead weight load of substantial magnitude and thereby limits acceleration of the piston during pneumatic extension to a safe value which prevents actuator destruction.

Further objects and advantages of the present invention will be apparent from the following description, reference being had to the accompanying drawing wherein a preferred embodiment of the present invention is clearly shown.

In the drawing:

Fig. 1 is a perspective view, partly in section and partly in elevation, of an actuator constructed according to this invention.

Fig. 2 is a sectional view taken along line 2—2 of Fig. 1.

With particular reference to the drawing, an actuator is disclosed comprising a cylinder 10 having disposed therein a reciprocable piston 12, which divides the cylinder into an extend chamber 14 and a retract chamber 17. Opposite ends of the cylinder 10 are closed by end caps 16 and 18, which are connected to the cylinder by screw threaded couplings. The piston 12 carries suitable sealing means 20, which engage the inner periphery of the cylinder 10. In addition, the piston is formed with an integral hollow rod 22, which extends through the tail cap 18 and is adapted for connection to a movable load, not shown, which prevents rotation of the piston. The head cap 16 of the cylinder has a suitable fixture 24 by which means the cylinder may be attached to a suitably fixed support, not shown, which, likewise, prevents rotation of the cylinder. Accordingly, the piston 12 is arranged for reciprocation relative to the cylinder 10.

As hereinbefore alluded to in simple actuator assemblies including only a cylinder with a reciprocable piston therein, it has been observed that during emergency pneumatic operation, as soon as the pneumatic pressure overcomes the combined force of the load and friction, the gas will expand rapidly and cause rapid movement of the piston which in some instances results in destruction of the actuator. To prevent this occurrence, the actuator of this invention includes inertia weight means for limiting acceleration of the piston during pneumatic operation. In order to reduce the size and mass of the inertia weight required to limit acceleration of the piston to a safe value during pneumatic operation, it is necessary to incorporate means which rotate rapidly during movement of the piston. This result is accomplished in the present invention by employing a rotatable screw shaft, which is operatively connected to the piston such that movement of the piston is dependent upon and effects rotation of the screw shaft, the inherent reduction of a nut and screw being employed to effect relatively rapid rotation of the screw shaft during relatively slow movement of the piston.

Thus, a rotatable screw shaft 26 is disposed within the cylinder 10 and extends into the hollow piston rod 16. The screw shaft 26 is formed with a semi-cylindrical spiral groove 28 and is threadedly connected to a nut 30 nonrotatably attached to the piston 12 and having a complementary semi-cylindrical spiral groove therein. The nut 30 and the screw shaft 26 are connected by a plurality of circulating balls, not shown, which form a conventional ball screw and nut coupling. Accordingly, upon movement of the piston 12, the screw shaft, or rotatable member, 26 will rotate. Moreover, during movement of the piston 12 to the left, or during the extending movement thereof, the screw shaft will rotate in a counterclockwise direction, while during movement of the piston 12 to the right, as viewed in the drawing, the screw shaft 26 will rotate in a clockwise direction.

The screw shaft 26 is rotatably journaled in the head cap 16 of the cylinder by ball bearing assemblies 32 and 34, the inner races 36 and 38 of which are retained between a screw shaft shoulder 40 and a nut 42 threadedly connected with the screw shaft. The outer races 44 and 46, respectively, of the bearing assemblies 32 and 34 are retained between an inner shoulder 48 on the head cap 16 and the end of the cylinder 10.

The inertia weight means comprise an annulus 50 disposed within the head cap 16 and restrained against axial movement relative to the screw shaft by a nut 52. The annulus 50 is connected to rotate with the screw shaft in a counterclockwise direction through a one-way roller clutch 54 comprising a cam member 56, a plurality of circumferentially spaced rollers, such as indicated by numeral 58, which are engaged by springs 60. The cam member 56 is connected to rotate with the screw shaft 26 by any suitable means, not shown, and in a conventional manner rotates the annulus 50 when the screw shaft rotates in a counterclockwise direction whereas the annulus 50 will remain stationary when the screw shaft rotates in the clockwise direction. A suitable member 62 is interposed between the nut 52 and the annulus 50, as shown in the drawing.

The head cap 18 is formed with passage means 64, constituting a port for the extend chamber 14, the passage 64 communicating with the extend chamber 14 through the spaces between the balls of bearing assemblies 32 and 34. Similarly, the tail cap 18 is formed with a passage 66, which communicates with the retract chamber 17. When the actuator is operated by hydraulic fluid under pressure, it will be understood that the passages 64 and 66 are connected by suitable conduits, not shown, to a valve by which either the extend chamber 14 or the retract chamber 17 may be supplied with hydraulic fluid under pressure while the opposite chamber is connected to drain. Upon failure of the hydraulic pressure system, the passage 64 may also be connected to an emergency pneumatic pressure system, not shown, to extend the actuator by manipulating a second valve, not shown.

During hydraulic operation of the actuator, the inertia weight 50 will impose only a slight additional load on the actuator during movement of the piston 12 to the left, since during hydraulic operation, the piston 12 moves smoothly at a slow velocity. During movement of the piston 12 to the right under hydraulic operation, the weight 50 will impose no additional load on the actuator since it is not coupled to the screw shaft in this instance. However, upon emergency, pneumatic operation of the piston 12 to the left, as viewed in the drawing, the inertia weight 50 will act as a substantial dead weight load so as to limit acceleration and the velocity of movement of the piston 12 to the left. Accordingly, the inertia weight 50 will limit the rate of movement of the piston 12 so as to prevent actuator destruction during emergency pneumatic operation.

From the aforegoing, it is readily apparent that the present invention provides an actuator assembly which may be operated by either hydraulic fluid under pressure or pneumatic pressure during emergencies without resulting in destruction of the actuator during pneumatic operation. Moreover, the inertia weight means which are coupled to the actuator screw shaft during rotation thereof in one direction will not appreciably increase the load imposed upon the actuator during hydraulic operation since during hydraulic operation, the actuator screw shaft rotates considerably slower than during pneumatic operation.

While the embodiment of the present invention as herein disclosed, constitutes a preferred form, it is to be understood that other forms might be adopted.

What is claimed is as follows:

1. An actuator assembly including, a cylinder, a reciprocable piston therein, a member rotatably journaled in the cylinder and operatively connected to said piston such that piston movement is dependent upon and effects rotation of said member, and inertia weight means operatively connected to said rotatable member so as to rotate therewith continuously in one direction, the operative connection between said inertia weight means and said rotatable member comprising one-way driving means.

2. An actuator assembly including, a cylinder, a reciprocable piston therein, a member rotatably journaled in the cylinder and operatively connected to said piston such that piston movement is dependent upon and effects rotation of said member, and inertia weight means operatively connected to said rotatable member so as to rotate therewith continuously in one direction, the operative connection between said inertia weight means and said rotatable member comprising a one-way clutch.

3. An actuator assembly including, a cylinder, a reciprocable piston disposed therein, a screw shaft rotatably journaled in the cylinder and operatively connected to said piston so as to rotate in response to piston movement, and an inertia weight operatively connected to said rotatable member so as to rotate therewith continuously in one direction, the operative connection between said inertia weight and said rotatable member comprising a one-way roller clutch.

4. An hydraulic actuator designed for hydraulic operation in both directions and pneumatic operation in one direction including, a cylinder, a reciprocable piston therein, a member rotatably journaled in the cylinder and operatively connected to the piston such that piston movement is dependent upon and effects rotation of said member, a rotatable inertia weight disposed within the cylinder, and a one-way driving connection between said weight and said rotatable member so that said weight will rotate continuously with said member in one direction for limiting acceleration of the member and the piston in said one direction during pneumatic operation.

5. An hydraulic actuator designed for hydraulic operation in both directions and pneumatic operation in one direction including, a cylinder, a reciprocable piston therein, a member rotatably journaled in the cylinder and operatively connected to the piston such that piston movement is dependent upon and effects rotation of said member, a rotatable inertia weight disposed within the cylinder, and a one way clutch interconnecting said weight and said rotatable member so that said weight will continuously rotate with said member in one direction for limiting acceleration of the member and the piston in said one direction during pneumatic operation.

6. An hydraulic actuator designed for hydraulic operation in both directions and emergency pneumatic operation in one direction including, a cylinder, a reciprocable piston therein, a member rotatably journaled in said cylinder and operatively connected to said piston so as to rotate upon piston movement, and an annular inertia weight operatively connected to said rotatable member so as to rotate therewith continuously in one direction for limiting acceleration of the member and the piston in said one direction during pneumatic operation, the operative connection between said annular inertia weight and said member comprising a one-way roller clutch.

7. A pneumatic actuator including, a cylinder, a reciprocable piston disposed in said cylinder, a screw shaft rotatably journaled in the cylinder and operatively connected to said piston whereby piston movement effects rotation of said screw shaft, and inertia weight means operatively connected to said screw shaft so as to rotate therewith continuously in one direction for limiting acceleration of the screw shaft and said piston in said one direction, the operative connection between said inertia weight means and said screw shaft comprising one-way driving means.

8. A pneumatic actuator including, a cylinder, a reciprocable piston disposed in said cylinder, a screw shaft rotatably journaled in the cylinder and operatively connected to said ipston whereby piston movement effects rotation of said screw shaft, and inertia weight means operatively connected to said screw shaft so as to rotate therewith continuously in one direction for limiting acceleration of the screw shaft and said piston in said one direction, the operative connection between said inertia weight means and said screw shaft comprising a one-way clutch.

9. An actuator assembly including a cylinder, a reciprocable piston therein, a screw shaft rotatably supported in the cylinder and having a threaded connection with said piston whereby piston movement effects rotation of said screw shaft, a cam member disposed within the cylinder and connected to said screw shaft, a plurality of circumferentially spaced spring biased rollers carried by said cam member, and an annular inertia weight encircling said cam member whereby said rollers will establish a continuously driving connection between said cam member and said inertia weight during rotation of said cam member and said screw shaft in one direction, said inertia weight limiting acceleration of the piston in one direction.

References Cited in the file of this patent

UNITED STATES PATENTS

| | | |
|---|---|---|
| 2,164,971 | Vickers | July 4, 1939 |
| 2,477,108 | Young | July 28, 1949 |
| 2,705,939 | Geyer | Apr. 12, 1955 |
| 2,758,527 | McFadden | Aug. 14, 1956 |